United States Patent Office 3,664,752
Patented May 23, 1972

3,664,752
PHOTOELECTRIC MEASURING DEVICES
Max R. L. Hermieu, Paris, France, assignor to Machines
Automatiques Modernes, Paris, France
Filed Dec. 9, 1969, Ser. No. 883,376
Claims priority, application France, Dec. 27, 1968,
181,096
Int. Cl. G01j 1/42, 5/52; G01n 21/22
U.S. Cl. 356—206                6 Claims

ABSTRACT OF THE DISCLOSURE

Photoelectric measuring device comprising means for transmitting a light beam and two photoelectric cells, one constituting a reference photocell and the other a measuring photocell, means for modulating said light beam, said cells delivering modulated signals of opposed polarities to a comparator connected to a resistance-capacity circuit for detecting the resultant modulated voltage, and co-acting with an AND circuit actuating a selector for controlling said comparator, whereby the measurement results from the cancellation or the phase reversal of the modulated signals.

The present invention relates to photoelectric measuring devices and has specific reference to devices of this character which are based on the absorption, reflection, refraction or transmission of light.

For example, this device may thus constitute the basis of an opacimeter, notably for determining the opacity of exhaust smoke or gas of vehicles; alternately, instead of being used for measuring a degree of light-blocking capacity, it can be used for measuring the light diffused by the measured object, for example in the case of the measurement of the concentration of particles in suspension in a liquid medium (if these particles have a light-reflecting power), it being understood that many other applications may be contemplated within the measurement field broadly defined hereinabove, for it is obvious that the measuring device according to this invention can be incorporated in any measuring apparatus operating by a light modification resulting from the application of a light flux to the measured medium or object.

Basically, the photoelectric measuring device according to the present invention, which comprises means for transmitting a light beam and two photoelectric cells, namely a reference photocell receiving directly one fraction of the light beam and a measuring photocell responsive to a light flux resulting from the application of the other fraction of the light beam to the measured medium or object, is characterized in that it comprises light-beam modulating means of a type already known per se, and that said photocells are connected to deliver modulated signals of opposed polarities which are fed to a comparator for detecting a zero resultant modulated voltage, this comparator comprising a plurality of resistors of graded ohmic values, adapted to be energized by a plurality of contacts closing in succession, said comparator having its output connected to a resistance-capacity circuit acting as a detector of the amplitude of the resultant modulated voltage, said successively-closing contacts being adapted to close in a manner responsive to a pulse selector-counter connected to the output of an AND circuit having two inputs, one responsive to modulated signals from one of said photocells and the other to the output signals from said resistance-capacity detector circuit, whereby the cancellation or phase-reversal of said modulated signals is attended by the stopping of said selector-counter on one of said contacts representing the measurement scale.

This device, although relatively simple, is capable of making rapid measurements with a very high degree of precision, and also of measuring and recording these measurements automatically.

Figure 1:
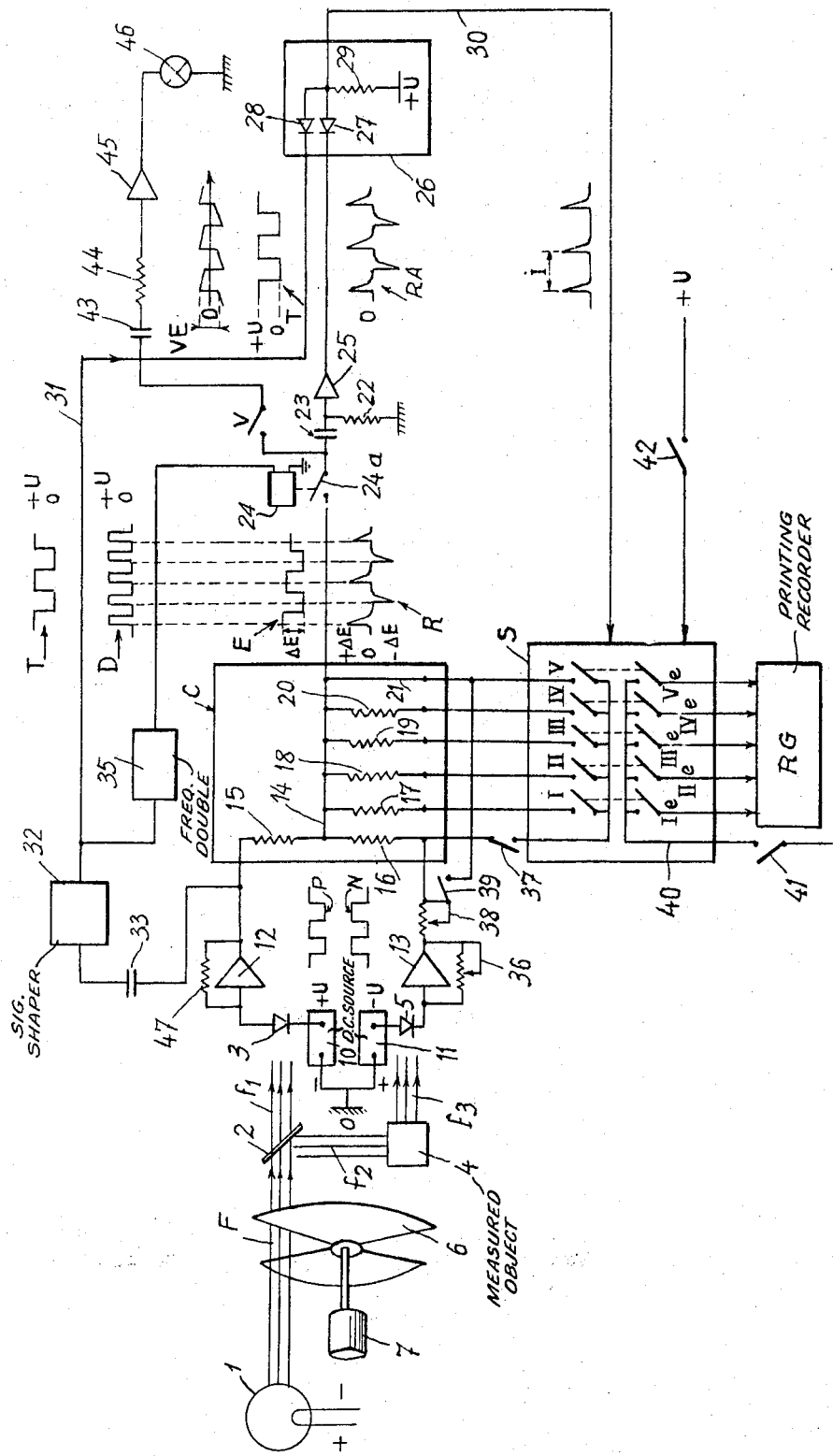
Figure 2:
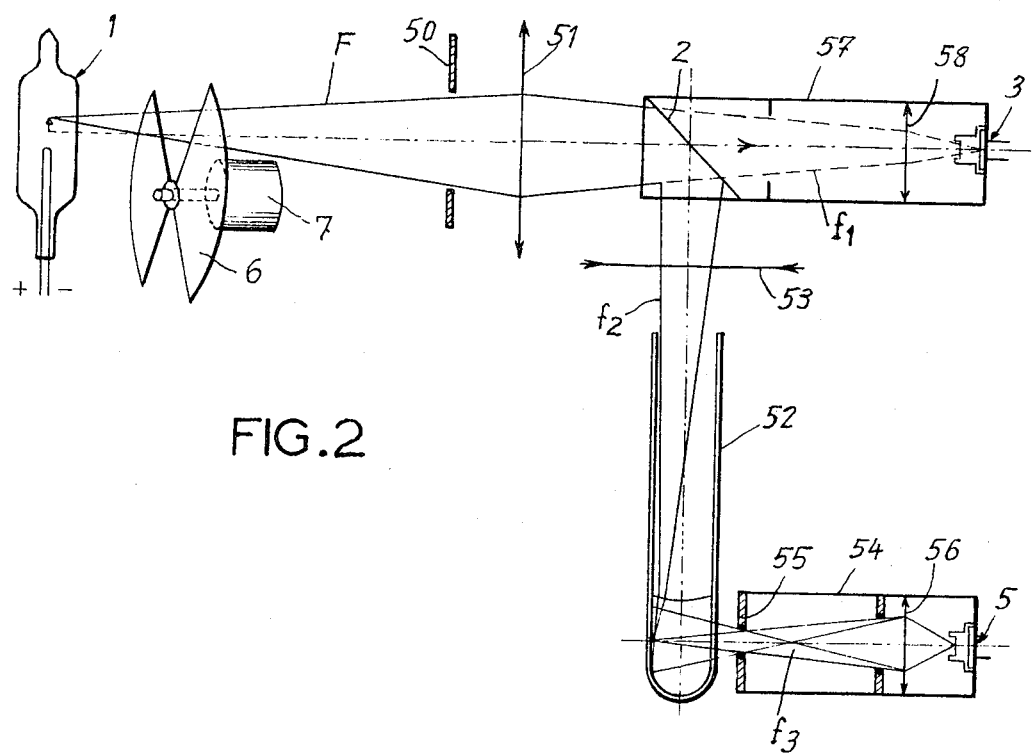

A typical form of embodiment of the present invention will now be described by way of example with reference to the attached drawing, in which:

FIG. 1 is a wiring diagram of a measuring device according to this invention, and FIG. 2 is a diagrammatic illustration of an exemplary application of the device for measuring the concentration of particles in a liquid medium.

Referring to FIG. 1, the reference numeral 1 designates a light source transmitting a light beam F onto a mirror 2 adapted to allow one fraction $f_1$ of the incident light flux to pass therethrough, for instance by providing stria formed in its reflecting surface, in the direction of a reference photoelectric cell 3, while reflecting the remaining fraction $f_2$ of the light flux onto the object, denoted 4, of the measurement, in order to measure with the assistance of another photoelectric cell 5 and according to one of the practical applications broadly listed hereinabove the light flux $f_3$ diffused by said object 4, the latter consisting for example of a test tube or cylinder containing a liquid and particles in suspension therein, of which it is desired to measure the concentration; in this case, it is clear that the light flux $f_3$ depends on this concentration. This measuring device is designed for operating according to the modulated light method and preferably by applying the light modulation to the source 1 proper; to this end, it comprises a chopper interposed in the beam F emitted from this source and consisting in this specific example of a twin-blade shutter 6 rotatably driven from an electric motor 7.

In this example the photocells 3 and 5 are photodiodes connected the one to the positive terminal of a D.C. current source 10 delivering a voltage +U, and the other to the negative terminal of another D.C. source 11 delivering a voltage −U, the other terminals of these sources being connected to the ground of the measuring device which is therefore designated as being at 0 voltage.

Both photodiodes 3 and 5 will thus deliver a modulated current to feedback-loop amplifiers 12 and 13 comprising a resistor 47 and potentiometer 36, respectively, the output voltages of these amplifiers producing P and N gated pulses, respectively, in response to the modulation of said light flux F.

The outputs of these amplifiers are connected to a comparator C comprising a conductor 14 to which the amplifier 12 is connected via a resistor 15 and to which the other amplifier 13 is connected via a resistor 16 having connected in parallel thereto other resistors, in this example four resistors 17, 18, 19 and 20, as well as a direct coupling 21. These five couplings lead to corresponding contacts I, II, III, IV and V either incorporated in a selector or counter S or associated with a device of this character so as to be closed in succession and separately in response to a sequence of control pulses the origin of which will be explained presently.

The comparator C is connected to a circuit for detecting a modulated voltage, this circuit comprising a resistor 22 and a capacitor 23, the aforesaid conductor 14 being connected to one plate of capacitor 23 via the movable contact 24a of a relay 24, the function of which will be discussed presently, the other plate of capacitor 23 being connected to resistor 22 forming in series with this capacitor a differentiating circuit the signals of which are fed to an amplifier 25. The latter is connected to one input of a two-input AND circuit 26 consisting in the known fashion of two diodes 27, 28 and a resistor 29, and having its output connected via a conductor 30 to selector S.

The other input of this AND circuit is connected through a conductor 31 to the output of a signal shaper or trigger 32 having its input connected to the output of the amplifier 12 of gated pulses P via a capacitor 33 adapted to filter the DC component of these pulses. The output of trigger 32 delivering signals having the waveform designated by the reference letter T and ranging from 0 to $+U$, in phase with gated pulses P, is also connected to a frequency doubling device 35 connected to said relay 24 and producing the signals denoted D in the drawing, the peaks of these signals corresponding to the successive median zones of the peaks and troughs, respectively of signals T, and also to the median zones of the signals of modulated resultant voltage to be obtained at the output of comparator C and illustrated at E, with an amplitude $\Delta E$, as being in phase with the gated signals T, this condition prevailing as long as signals P are predominant in reference to signals N in conductor 14.

Under these conditions it is clear that the successive closing of contact 24a of relay 24 in response to signals D will cause the capacitor 23 to obtain by turns the voltages of the peaks and troughs of gated pulses E. The voltage across the terminals of resistor 22 has then the waveform shown at R, with amplitude variations ranging from $+\Delta E$ to $-\Delta E$, and these voltage variations of the differentiating circuit are fed to the AND circuit 26 after proper amplification by amplifier 25 delivering corresponding signals RA.

This AND circuit of which the resistor 29 is fed with voltage $+U$ will thus deliver a control pulse to selector S each time its inputs receive simultaneously the peaks of signals T and the positive peaks of signals RA; in other words, it will deliver pulses at the time interval or rating I of said last-named peaks.

These pulses fed to selector S will cause the successive closing of contacts I to V, thus energizing in succession the resistors 17 to 20 of comparator C and possibly establishing a direct connection 21. These resistors are of gradually decreasing values and constitute with said contacts the measurement scale of the device, adapted to be calibrated, as will be explained presently with reference to a practical form of embodiment or application. What should be borne in minde for the time being is that each pulse delivered by said AND circuit will cause, through the energization in said comparator of a resistor of smaller value than the preceding one, a reduction in the amplitude of the gated pulse of series E which is to follow the gated pulse having originated this pulse through the positive peaks E and RA.

Thus, when the modulation of signals E is initially zero or becomes zero, or alternately when this modulation is subjected to a phase reversal in relation to modulation T, as observed when the change of energized resistor in comparator C causes a signal N to be predominant over the corresponding signal P in conductor 14 (thus producing the reversal of the peaks designated at RA), the AND circuit will not emit pulses towards selector S, and one of the contacts I to V will remain closed to display the result of the measurement, according to the intensity of light flux $f_3$.

It will be noted that this device is easily applicable to any desired measurement scale; in other words, according to the desired degree of precision, the number of measuring circuits to be operated by the selector may easily be increased, since it is only a matter of changing the number of successively closing contacts of the selector and of resistors or combinations of resistors energized through said contacts. The number of contacts may therefore be of the order of one hundred, for example, without altering the rapidity of the measurement, for if the chopper or trigger 32 is driven from a 50 c.p.s. AC synchronous motor, 100 gated pulses per second are obtained, so that a 100-contact measurement scale can be scanned in one second.

It is a relatively simple matter to record the measurement electrically by using front-contact recording circuits established in conjunction with the selector circuits and therefore operatively connected thereto. Thus, for example, the selector-counter S may be of a type comprising a series of transistors energized in succession and rendered conductive by the control pulses from said AND circuit, each transistor comprising in its collector circuit a two-contact relay, one contact being in this case one of the aforesaid contacts I to V, for closing the measuring circuit, the other contact constituting in the same case one of the contacts Ie to Xe inserted in the corresponding recording circuits.

Bearing in mind that the measurement proper will be completed, in principle, by the closing of one of contacts I to V, in this case one of the corresponding contacts Ie to Ve will also be closed and this consequence may be utilized in various ways, for example by lighting a corresponding control light to indicate the result of the measurement to the operator, or alternately, as shown diagrammatically in FIG. 1, for controlling a printing recorder Rg; in this case contacts Ie to Ve have a common energizing conductor 40 having inserted therein a recording control switch or contact 41; however, an additional recording contact may also be coupled to the 0 terminal of selector S. Thus, notably, this contact 41, in the specific case of the application of the device of this invention to a machine for automatically introducing samples to be measured into the measuring light beam, may be controlled by a cam forming part of the mechanism for driving the samples step by step, or operatively associated with this mechanism, thus permitting the automatic recording at the desired point. A circuit for resetting the selector S and comprising a contact 42 may be provided for actuation by the operator or the printer control means, so as to operate after the measurement result has actually been recorded.

A calibration of this measuring device may easily be the extreme cases likely to occur, for example by using samples 4 consisting, in the specific case contemplated herein concerning the measurement of particle concentration, of two reference concentrations corresponding to the maximum and minimum concentrations to be measured, respectively.

The calibration of the maximum concentration, yielding a maximum current applicable to amplifier 13 due to the maximum light diffusion resulting therefrom, is obtained by means of potentiometer 36 connected in parallel to said amplifier, the measuring circuit comprising for this calibration only resistor 16 opposed to resistor 15, a switch 37 being provided for neutralizing the comparator.

The calibration of the minimum concentration, yielding a minimum current applicable to amplifier 13 due to the minimum light diffusion resulting therefrom, is obtained by means of a potentiometer 38 connected in series with said amplifier, the measuring circuit connecting directly, for this calibration, the output of potentiometer 38 to conductor 21 via a manual switch 39.

In either case the search for the zero resultant modulated voltage on conductor 14 may be made by resorting to a pilot-lamp visual control circuit. This circuit is branched off the detector circuit between capacitor 23 of this detector circuit and contact 24a, and comprises a main switch V for this visual circuit, a capacitor 43, a resistor 44, an amplifier 45 and a pilot lamp 46. When the device is operated with one of the calibration samples and switch V of visual control circuit is closed, an alternating voltage having the waveform shown at VE, which is a function of the amplitude $\Delta E$ of the resultant modulated voltage at the output of comparator C, is fed to amplifier 45 and therefore to the pilot lamp. In this case the calibration is obtained when the pilot light 46 is extinguished with the assistance of potentiometers 36 or 38, accordingly as the calibration applies to a maximum or a minimum concentration.

It will be noted that when the visual control circuit thus disposed is switched on, closing contact 24a will cause both capacitors 23 and 43 to be charged, capacitor 43 constituting with resistor 44 a unit having a greater time constant than unit 22–23, so that when contact 24a is re-opened these capacitors will discharge into each other until the same contact is closed again, and so on as long as a modulated resultant current is available.

The frequency doubler 35 is preferably of a type adapted to produce positive peaks having a duration considerably shorter than that of the troughs extending between these peaks, so that the modulated current voltages detected by turns when closing contact 24a are not influenced by irregularities likely to arise in the gated pulses E in the vicinity of their corners and that the precision of both the measurement and the calibration is greatly increased, thus making it preferable to branch the calibration visual control circuit off the line connecting switch 24a to capacitor 23, in lieu of upstream of said switch 24a.

With the above-listed advantages the device of this invention further comprises other advantageous features already known per se which result from the fact that the relative measurement between the reference photocell and a measuring photocell will ensure a protection against possible variations in the light source and the common sensitiveness variations of these cells, and that the modulation of the light beam eliminates the effect of the darkness current of these cells.

FIG. 2 illustrates diagrammatically the arrangement of an apparatus corresponding to the application of the device of this invention to the measurement of the concentration of particles in suspension in a liquid, said concentration being measured in cylinders adapted to be fed in succession to the measuring station.

In this figure the component elements of the device which are homologous to those illustrated in FIG. 1 are designated by the same reference numerals, the light beam F passing through a diaphragm 50 and a convergent lens 51, so that the mirror 2 will reflect in a vertical downward direction a convergent beam $f_2$ into the underlying cylinder 52 in proper measuring position, a divergent lens 53 being utilized in this case in combination with the convergent lens 51 for producing a beam penetrating freely into the cylinder 52 and converging into the median zone of the liquid, where the measurement is to be made.

At this level an extending transversely to the cylinder 52 is an optical tube 54 provided with an input diaphragm 55 and a lens 56 adapted to concentrate the light rays onto the photocell 5 for measuring the light of the beam $f_3$ diffused by the particles in suspension in the selected zone. The mirror 2 is disposed ahead of another optical tube 57 comprising a lens 58 for concentrating the beam $f_1$ onto the reference photocell 3.

Of course, this is only one of the many possible applications of the device of this invention, of which the field has been summarized in the preamble of this description.

What is claimed as new is:

1. Apparatus for measuring the optical properties of a substance, comprising:
    means for producing and transmitting a light beam;
    means for modulating said light beam;
    means for splitting said modulated beam into first and second portions and for applying said second portion of said modulated beam to a substance to be measured;
    means, including a reference photocell, for receiving said first portion of said modulated beam, said reference photocell having a modulated voltage output which is proportional to the strength of said received first portion;
    means, including a measuring photocell, for receiving the light flux resulting from the application of said second portion to said substance to be measured, said measuring photocell having a modulated voltage output which is proportional to the strength of said received light flux;
    means for comparing the outputs of said reference and measuring photocells to produce a resultant modulated voltage signal, including a comparator comprising a plurality of resistors of graded ohmic values and means, including a like plurality of movable contact members, for successively energizing said resistors;
    differentiating circuit means connected to the output of said means for comparing for operating on said resultant modulated voltage signal;
    an AND circuit having first and second inputs;
    means applying the modulated output from said reference photocells to said first input;
    means applying the output from said differentiating circuit means to said second input;
    a pulse-selector counter;
    means connecting said pulse-selector counter to the output of said AND circuit; said movable contact members being selectively movable in response to the operation of said counter; and
    means for indicating the positions of said movable contact members as a measure of the optical properties of said substance.

2. A measuring device according to claim 1, further comprising means to double the frequency of the modulated output of said reference photocell and a relay-type switch between said comparator and said differentiating circuit means responsive to said frequency doubling means.

3. A measuring device according to claim 1 further comprising a D.C. filtering capacitor and a trigger in series with said first input connection of said AND circuit.

4. A measuring device according to claim 1, further comprising a printing recorder and means to control said recorder, including a set of corresponding contacts in parallel with said movable contact members.

5. A measuring device according to claim 1, further comprising an amplifier connected to the output of said measuring photocell, means, including a first potentiometer in parallel to said amplifier, for calibrating said amplifier according to the maximum light flux and minimum light flux to be measured, means connecting said first potentiometer to that one of said resistors of said means for comparing which corresponds to the limit of measurement under maximum-flux conditions, and a second potentiometer in series with said amplifier and directly connected to the output of said means for comparing, and means, including a pilot lamp circuit connected in parallel to said detector means for visually indicating the calibration of said amplifier.

6. A measuring device according to claim 1, further comprising means to direct said second portion of the modulated light beam which is applied to the substance to be measured along an axis normal to a surface of the medium so as to illuminate the same directly, said measuring photocell being disposed to receive transversely from said substance, light diffused by particles in the zone illuminated by said second portion to thereby measure the concentration of particles in suspension in the substance.

References Cited

UNITED STATES PATENTS

| 3,324,304 | 7/1943 | Katzman | 356—208 |
| 2,722,156 | 11/1955 | Warren | 356—206 |
| 2,803,752 | 8/1957 | Warren | 356—206 X |
| 2,953,440 | 9/1960 | Claudy | 356—206 X |
| 3,414,729 | 12/1968 | Warren | 356—95 UX |
| 3,422,678 | 1/1969 | Murray | 356—217 X |
| 3,435,213 | 3/1969 | Colbow et al. | 356—217 X |
| 3,446,972 | 5/1969 | Bentley et al. | 356—229 X |
| 3,514,209 | 5/1970 | McGhee et al. | 356—226 X |
| 3,527,540 | 9/1970 | Bowker et al. | 356—226 X |
| 3,487,225 | 12/1969 | Button | 356—205 X |
| 3,503,684 | 3/1970 | Preston, Jr. et al. | 356—39 |
| 3,562,795 | 2/1971 | Frenk | 356—206 X |

RONALD L. WILBERT, Primary Examiner

W. A. SKLAR, Assistant Examiner

U.S. Cl. X.R.

250—209, 218; 356—48, 104, 208, 211, 224